US011192800B2

(12) United States Patent
Welch

(10) Patent No.: US 11,192,800 B2
(45) Date of Patent: Dec. 7, 2021

(54) VAPOR COMPRESSION DISTILLATION ASSEMBLY

(71) Applicant: WHIRLPOOL CORPORATION, Benton Harbor, MI (US)

(72) Inventor: Rodney M. Welch, Eau Claire, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/288,551

(22) Filed: Feb. 28, 2019

(65) Prior Publication Data

US 2019/0292072 A1 Sep. 26, 2019

Related U.S. Application Data

(60) Provisional application No. 62/646,551, filed on Mar. 22, 2018.

(51) Int. Cl.
| | | |
|---|---|---|
| *C02F 1/04* | (2006.01) | |
| *C02F 1/06* | (2006.01) | |
| *B01D 1/28* | (2006.01) | |
| *B01D 1/22* | (2006.01) | |
| *B01D 3/10* | (2006.01) | |

(52) U.S. Cl.
CPC ............. *C02F 1/041* (2013.01); *B01D 1/223* (2013.01); *B01D 1/284* (2013.01); *B01D 1/289* (2013.01); *B01D 1/2881* (2013.01); *B01D 1/2887* (2013.01); *B01D 3/106* (2013.01); *C02F 1/06* (2013.01)

(58) Field of Classification Search
CPC .......... B01D 1/28; B01D 1/222; B01D 1/223; B01D 3/10; B01D 3/108; C02F 1/041
See application file for complete search history.

(56) References Cited

U.S. PATENT DOCUMENTS

| | | | |
|---|---|---|---|
| 2,339,862 A | * | 1/1944 | Kleinschmidt .......... B01D 1/28 203/2 |
| 2,734,023 A | | 2/1956 | Hickman |
| 2,777,313 A | | 1/1957 | Dodge |

(Continued)

FOREIGN PATENT DOCUMENTS

| | | |
|---|---|---|
| CN | 203113114 U | 8/2013 |
| CN | 103387270 A | 11/2013 |

(Continued)

OTHER PUBLICATIONS

"Comparison Between Reciprocating and Centrifugal Compressors", ME—Mechanical Engineering, Jan. 1, 2016 (date obtained from WayBackMachine), URL: https://web.archive.org/web/20160101141012/https://me-mechanicalengineering.com/comparison-between-reciprocating-and-centrifugal-compressors/ (Year: 2016).*

(Continued)

*Primary Examiner* — Jonathan Luke Pilcher
(74) *Attorney, Agent, or Firm* — McGarry Bair PC

(57) ABSTRACT

A vapor compression distillation assembly for distilling influent liquid, the vapor compression distillation assembly comprising a housing defining an interior and having an inlet for influent liquid, an evaporator and a condenser provided within the housing interior, an outlet for distillate, and at least one compressor fluidly coupled with the housing interior.

14 Claims, 6 Drawing Sheets

(56) References Cited

U.S. PATENT DOCUMENTS

| | | |
|---|---|---|
| 2,899,366 A | 8/1959 | Hickman |
| 3,110,544 A | 11/1963 | Moulthrop |
| 3,366,158 A * | 1/1968 | Rosenblad ............ B01D 1/28 159/13.3 |
| 3,956,072 A | 5/1976 | Huse |
| 4,305,211 A | 12/1981 | Peterson |
| 4,306,940 A * | 12/1981 | Zenty ............... B01D 1/28 202/153 |
| 4,811,495 A | 3/1989 | Huang et al. |
| 5,131,169 A | 7/1992 | Jaster |
| 5,357,771 A | 10/1994 | Schaal |
| 5,430,956 A | 7/1995 | Lange |
| 5,459,945 A | 10/1995 | Shulenberger |
| 5,724,750 A | 3/1998 | Burress |
| 5,810,975 A | 9/1998 | Bourdel |
| 5,980,695 A | 11/1999 | Cox et al. |
| 6,238,524 B1 * | 5/2001 | Zebuhr ............... B01D 1/223 159/18 |
| 6,261,419 B1 * | 7/2001 | Zebuhr ............... B01D 1/223 159/18 |
| 6,370,798 B1 | 4/2002 | Gonzalez, Sr. |
| 6,402,897 B1 * | 6/2002 | Gunn ................ B01D 1/28 159/47.1 |
| 6,689,251 B2 * | 2/2004 | Zebuhr ............. B01D 1/2887 159/24.1 |
| 6,802,941 B2 * | 10/2004 | Zebuhr ............. B01D 1/2887 159/24.1 |
| 9,255,732 B2 | 2/2016 | Shu et al. |
| 9,605,897 B2 | 3/2017 | Hyde et al. |
| 2003/0132095 A1 * | 7/2003 | Kenet ............... C02F 1/04 202/182 |
| 2004/0083773 A1 | 5/2004 | North |
| 2014/0245630 A1 | 9/2014 | McCarthy |

FOREIGN PATENT DOCUMENTS

| | | |
|---|---|---|
| CN | 103924427 A | 7/2014 |
| CN | 205529590 U | 8/2016 |
| CN | 106352669 A | 1/2017 |
| CN | 106868834 A | 6/2017 |
| DE | 3641665 A1 | 6/1988 |
| DE | 3644077 A1 | 7/1988 |
| DE | 102006041431 A1 | 6/2007 |
| EP | 0043361 A1 | 1/1982 |
| EP | 2609245 B1 | 12/2016 |
| FR | 882282 A | 5/1943 |
| FR | 1501448 A | 11/1967 |
| GB | 2272753 A | 5/1994 |
| GB | 2366810 A1 | 3/2002 |
| JP | 1223997 A | 9/1989 |
| JP | 7178288 A | 7/1995 |
| KR | 200320970 Y1 | 7/2003 |
| KR | 20040090051 A | 10/2004 |
| WO | 2004074187 A1 | 9/2004 |
| WO | 2014110957 A1 | 7/2014 |
| WO | 2014205430 A1 | 12/2014 |

OTHER PUBLICATIONS

European Patent Office, European Search Report re Application No. 19164100.0-1018, dated Oct. 8, 2019, 6 pages, Munich, Germany.

European Search Report for Counterpart EP19164087.9, dated May 6, 2019.

* cited by examiner

VAPOR COMPRESSION DISTILLATION ASSEMBLY

CROSS REFERENCE TO RELATED APPLICATIONS

This application claims priority under 35 U.S.C. § 119(e) to U.S. Provisional Patent Application No. 62/646,551, filed Mar. 22, 2018, entitled "VAPOR COMPRESSION DISTILLATION ASSEMBLY," which is herein incorporated by reference in its entirety.

BACKGROUND

Systems or assemblies for water reclamation or water recycling can be employed to remove contaminants from a used liquid and reclaim purified liquid that can then be stored or re-used as desired. One common method for reclaiming or recycling water is through vapor compression distillation. In a vapor compression distillation process, influent liquid is heated to the boiling point to effect evaporation. During evaporation, the water is converted to water vapor, while contaminants present in the influent liquid are left behind and can be collected and removed from the assembly. The water vapor is compressed, then moves to a condenser, where it condenses at a higher temperature than the evaporation temperature to allow the energy of condensation to be used for evaporating more water. The condensed effluent distillate and can be output from the water recycling assembly to be stored or re-used.

BRIEF SUMMARY

In one aspect, the disclosure herein relates to a vapor compression distillation assembly comprising a housing defining a low pressure interior and having an influent inlet and distillate outlet, an evaporator located within the low pressure interior and fluidly coupled to the influent inlet, a condenser located within the lower pressure interior and fluidly coupled to the distillate outlet, and a compressor fluidly coupling the evaporator to the condenser, wherein liquid entering the influent inlet is evaporated by the evaporator to generate a vapor, the compressor pressurizes and increases the temperature of the vapor as the compressor supplies the vapor to the condenser, where the condenser condenses the vapor to liquid distillate while transferring heat to the condenser, with the liquid distillate exiting the distillate outlet, with the transferred heat being returned to the low pressure interior by the condenser.

In another aspect, the disclosure herein relates to a method of transforming an influent fluid to a distillate within a vapor compression distillation assembly having a housing defining an interior and including an evaporator and condenser within the interior, the method comprising establishing an internal pressure below ambient within the interior, receiving through an influent inlet the influent liquid, transforming the influent liquid to a water vapor by flash boiling the influent liquid, compressing the water vapor within a manifold, condensing the water vapor into distillate within a condenser, and removing the distillate via a distillate outlet in the housing.

In yet another aspect, the disclosure herein relates to an appliance comprising a vapor compression distillation assembly, the vapor compression distillation assembly comprising a housing defining a low pressure interior and comprising an influent inlet and a distillate outlet, a manifold for collecting water vapor, a compressor fluidly coupled with the housing interior for pumping water vapor from the low pressure interior to the manifold; and a condenser comprising an interior condensing portion for forming distillate and fluidly couple to the distillate outlet.

DETAILED DESCRIPTION

Traditional vapor compression distillation assemblies and processes for distillation or desalination of water can be highly effective, but can also be inefficient, employ very high operating temperatures, and use expensive materials for construction. Heating the influent liquid to the boiling point for evaporation calls for significant energy input and can result in long startup times for the system to warm up to appropriate operating temperatures. As a result, there is either a significant lag time to allow for pre-heating from a cold start, which can take several hours, or the assembly must be run as a steady state process, such as a standby mode which continuously maintains preheat temperature so that startup can occur quickly, which wastes energy. The high temperatures sustained within the vapor compression distillation assembly create a need to use expensive materials that can withstand the high temperatures without cracking or damage, as well as for insulative materials to be incorporated to reduce the amount of heat energy lost from the vapor compression distillation assembly. Additionally, after evaporation and condensation, the distillate liquid can also have a high temperature, which may not be suitable for the desired end use, for example, if the distillate is intended to be used for immediate drinking water.

Figure 1:
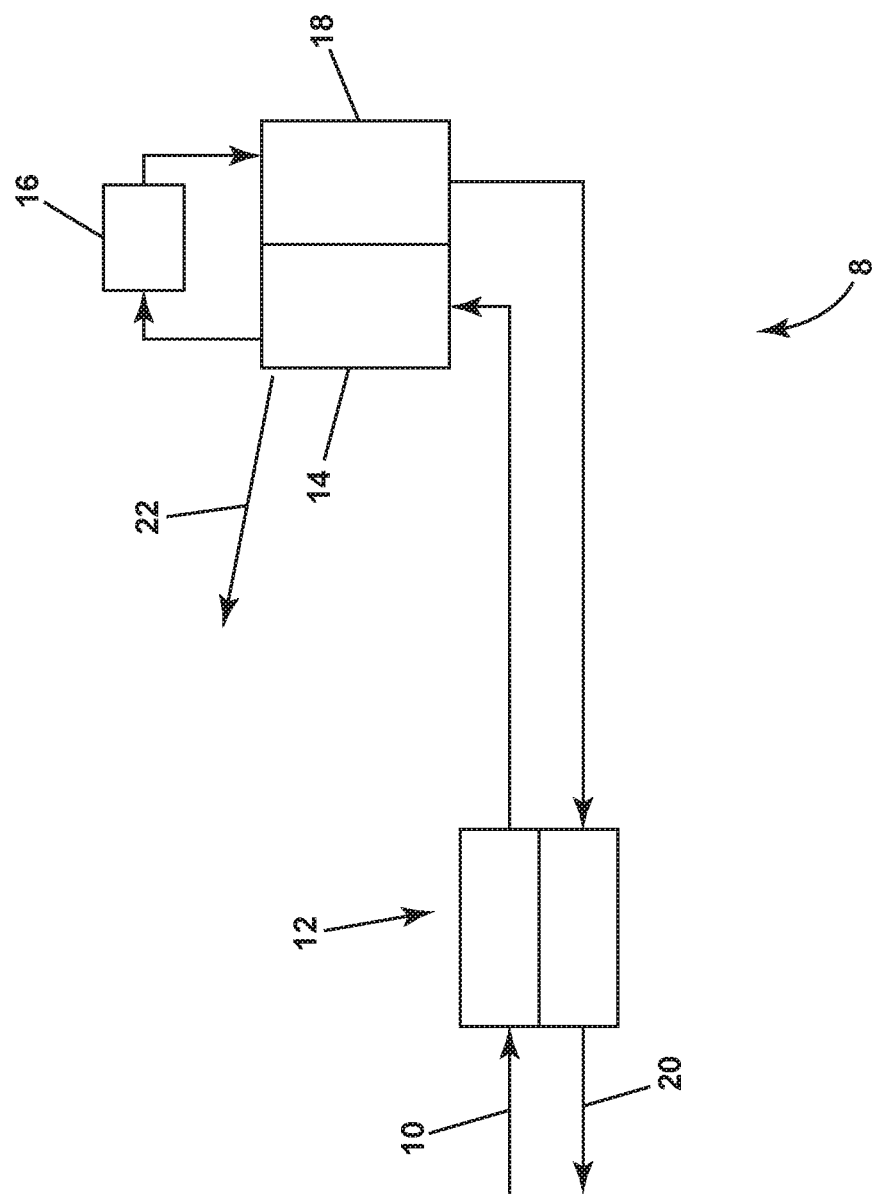
FIG. 1 illustrates a schematic representation of traditional vapor compression distillation processes.

FIG. 1 illustrates a schematic representation of a traditional vapor compression distillation assembly 8. Influent liquid enters the vapor compression distillation assembly 8 at an inlet 10. The influent liquid can be any suitable liquid to be distilled or desalinated, such as used or dirty water that can contain contaminants. The influent liquid can enter the inlet 10 at a temperature lower than a boiling point, such as at room temperature, and can enter a heat exchanger 12. The heat exchanger 12 heats the influent liquid via the heat of the distillate exiting the vapor compression distillation assembly 8. Because the influent liquid must be heated from the current temperature to the boiling point, the heating of the influent liquid by the distillate in the heat exchanger 12 requires a very high degree or percentage of heat recapture from the distillate, which can be difficult to achieve. One way to achieve such a high percentage of heat recapture is to provide the heat exchanger 12 with large surface areas, resulting in increased cost of manufacture.

The heated influent liquid then flows from the heat exchanger 12 into the evaporator 14. In the evaporator 14, the water in the heated influent liquid is evaporated to water vapor. Any contaminants that were present in the influent liquid are left behind in the evaporator 14 and can be collected to exit the vapor compression distillation assembly 8 via a concentrate outlet 22. The water vapor then proceeds from the evaporator 14 to a compressor 16 to be compressed. The compressed water vapor enters a condenser 18 and is condensed to produce the distillate, pure water. The distillate exiting the condenser 18 can still be at or near the boiling temperature as it exits the condenser 18 and flows through the heat exchanger 12 to transfer heat to the influent liquid, then the distillate can exit the vapor compression distillation assembly 8 at or near room temperature via an outlet 20. An additional heat exchanger (not shown) can be included to transfer further heat to the influent liquid from the concentrate before it exits the vapor compression distillation assembly 8 via the concentrate outlet 22.

Figure 2:
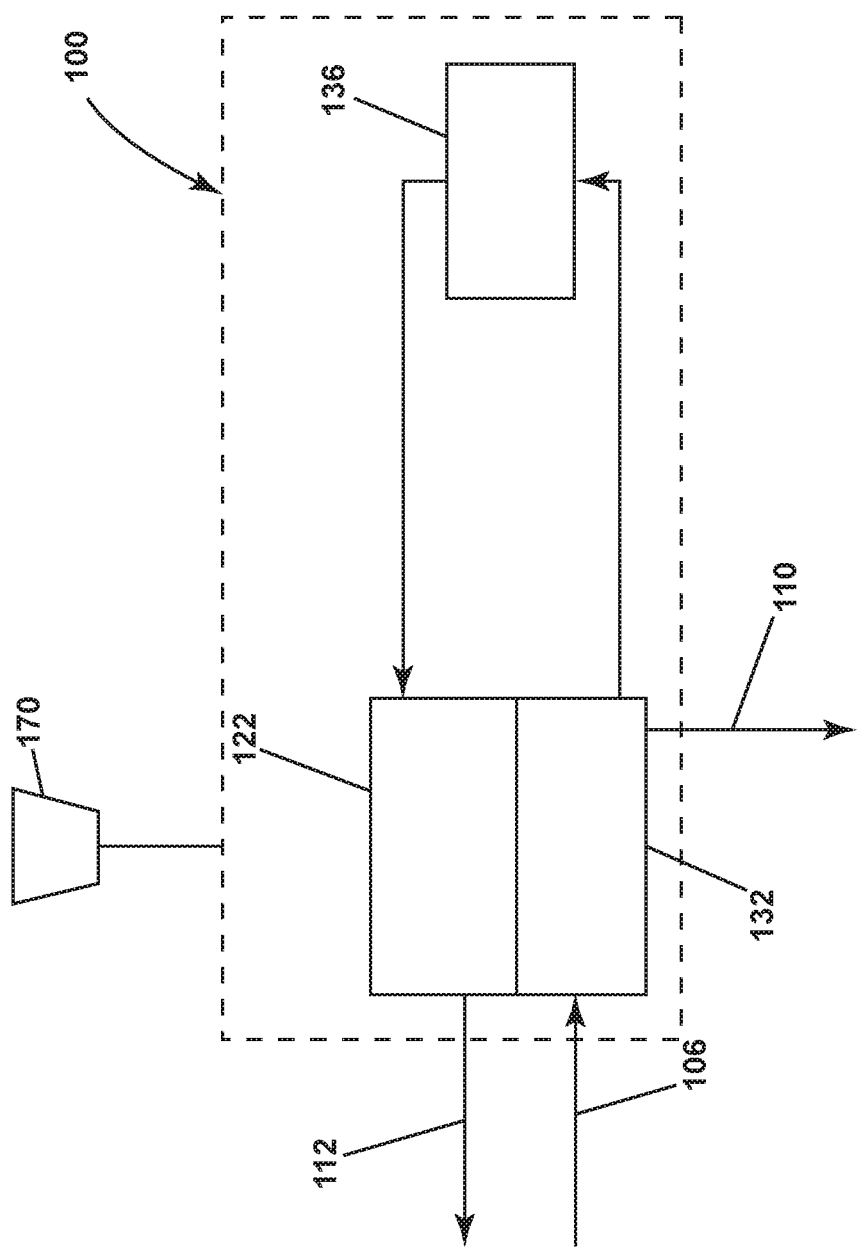
FIG. 2 illustrates a schematic representation of a vapor compression distillation process according to an embodiment of the present disclosure.

FIG. 2 illustrates a schematic representation of a vapor compression distillation assembly 100 according to an embodiment of the present disclosure. Influent liquid enters the vapor compression distillation assembly 100 at an influent inlet 106. The influent liquid can enter the influent inlet 106 at a temperature lower than the boiling point, such as at room temperature. There is no need for a heat exchanger as there is in the traditional vapor compression distillation assembly 8, because in the vapor compression distillation assembly 100 of the present disclosure, the vapor compression distillation assembly 100 is maintained at a low pressure relative to ambient pressure via an external compressor 170 or pump. Specifically, the pressure of the vapor compression distillation assembly 100 is low enough that the influent liquid will flash boil and evaporate at or near ambient temperature, eliminating the heating step and the need for the heat exchanger.

Rather, the influent liquid flows into the vapor compression distillation assembly 100 via the influent inlet 106, where the water in the influent liquid is flash boiled and evaporated to water vapor. Any soil or solid contaminants that were present in the influent liquid are left behind in the vapor compression distillation assembly 100 and can be collected to exit the vapor compression distillation assembly 100 via a concentrate outlet 110. The water vapor then proceeds through a compressor 136 to be compressed, which can raise the temperature of the water vapor slightly. The compressed water vapor enters a condensing portion 160 via a manifold 122 and is condensed to produce the distillate, pure water. The distillate exiting the condensing portion 160 can still be at or near room temperature, or only slightly above room temperature due to the heat of compression, so there is no need to recapture heat from the distillate. The distillate can then exit the vapor compression distillation assembly 100 at or near room temperature via a distillate outlet 112.

Figure 3:
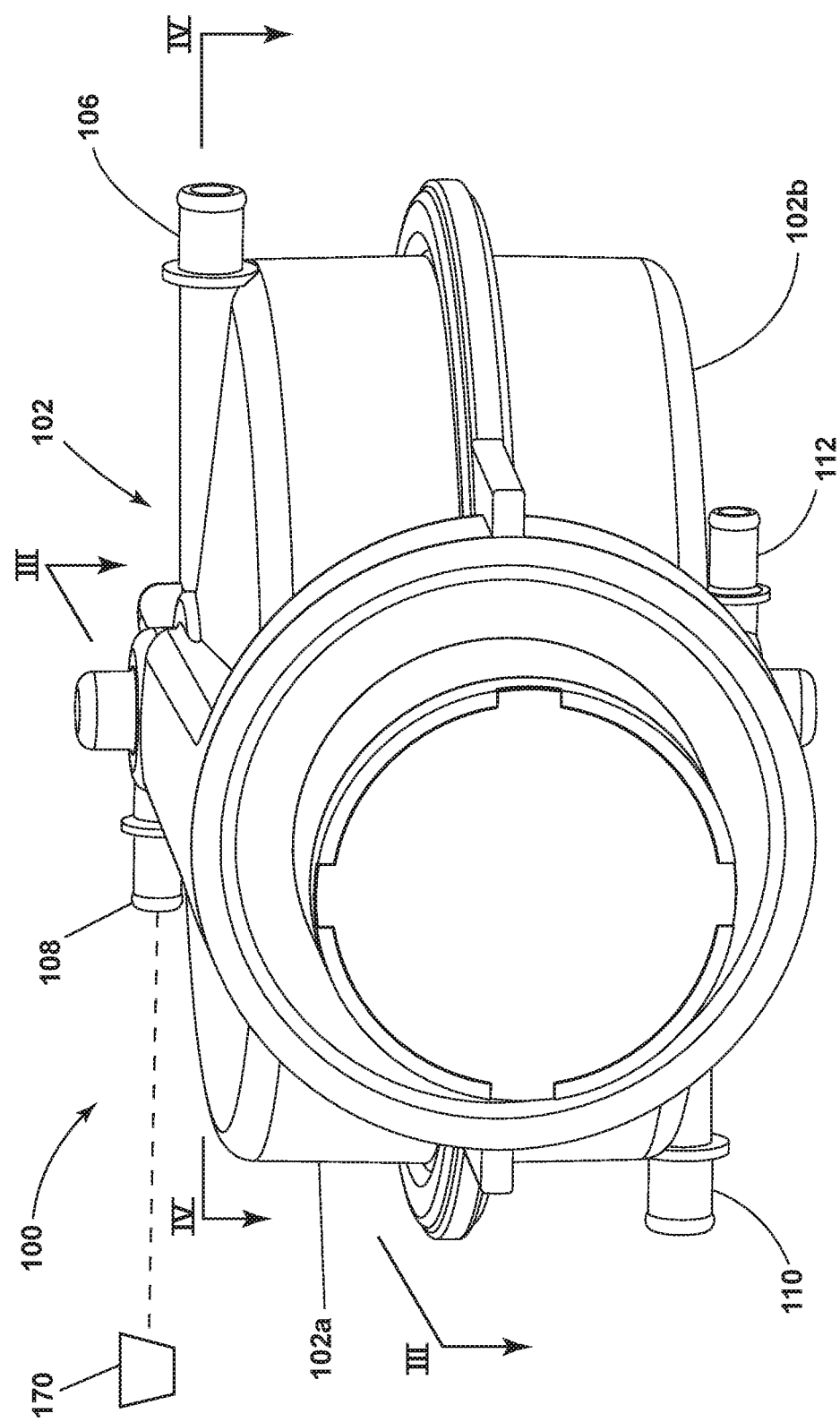
FIG. 3 illustrates a perspective view of an exemplary vapor compression distillation assembly for use with the process of FIG. 2 according to an embodiment of the present disclosure.

FIG. 3 illustrates a perspective view of an exemplary vapor compression distillation assembly 100 according to an embodiment of the present disclosure. A housing 102 at least partially defines a housing interior 104 (FIG. 4) and can comprise an upper housing 102a and a lower housing 102b. The upper housing 102a can define the influent inlet 106 and a non-condensable gas outlet 108. The external compressor 170 can be coupled to the non-condensable gas outlet 108. The lower housing 102b can define the concentrate outlet 110 for contaminants removed from the influent liquid, as well as the distillate outlet 112 for the condensed liquid.

Figure 4:
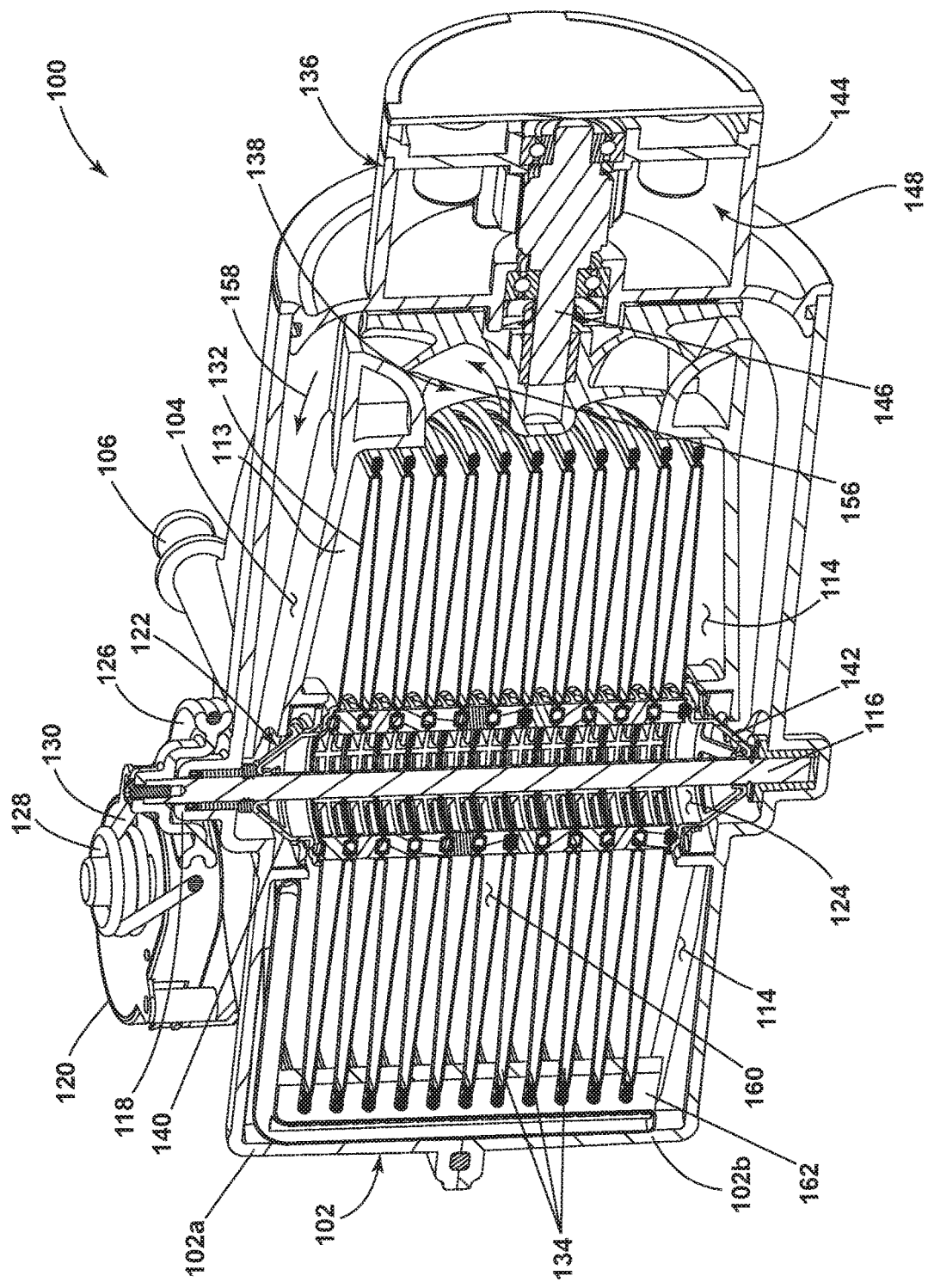
FIG. 4 illustrates a perspective cross-sectional view of the vapor compression distillation assembly of FIG. 3.

FIG. 4 illustrates a cross-sectional view of the vapor compression distillation assembly 100 in which the components within the housing interior 104 can be seen. The housing interior defines an evaporator portion 113 fluidly coupled to the influent inlet 106. The lower housing 102b further defines a sump 114 for collecting contaminants and concentrate left behind after evaporation of the influent liquid. A rotating shaft 116 extends from the lower housing 102b upwardly through a shaft opening 118 in the upper housing 102a, where the rotating shaft 116 is operably coupled to a motor 120 via pulleys 126, 128 and a drive belt 130 to effect rotation of the rotating shaft 116. While the rotating shaft 116 is illustrated herein as being driven by the motor 120 and pulleys 126, 128, it will be understood that the rotating shaft 116 can be driven by any suitable method for driving rotation of a shaft. A manifold 122 is provided circumferentially about the rotating shaft 116 and extends along the vertical height of the rotating shaft 116 to provide an open vertical channel for condensed distillate to drip down to a bottom portion of the manifold 122 to be collected. The manifold 122 includes an upper cap 140 and a lower cap 142, the lower cap 142 defining a collecting portion 124 where distillate is collected and directed to the distillate outlet 112 to exit the vapor compression distillation assembly 100.

A rotatable disc assembly 132 comprising a plurality of stacked hollow discs 134 is provided circumferentially about and coupled to the manifold 122 and the rotating shaft 116 such that the interiors of the hollow discs 134 define the condensing portion 160, which is in fluid communication with the manifold 122 and the collecting portion 124. The hollow discs 134 can be fluidly sealed at their outer edges to define the interior of the hollow disc 134, or the condensing portion 160, and an exterior of the hollow disc 134. This creates a large amount of surface area of the hollow discs 134 within the vapor compression distillation assembly 100, which can be used to encourage and to maximize condensation and evaporation within the vapor compression distillation assembly 100. Specifically, the exterior surface area of the hollow discs 134 can be used for evaporation of the influent liquid, while the interior surface area of the hollow discs 134 can be used for condensation of the compressed water vapor. In an exemplary embodiment, the hollow discs 134 can be formed of steel, which can be stainless steel. The hollow discs 134 can be fixedly coupled to the manifold 122, as well as optionally to one another such that the hollow discs 134 are held in a fixed, spaced relationship to one another.

The compressor 136 is coupled to the housing 102 and in fluid communication with the housing interior 104. The compressor 136 comprises a motor housing 144 within which a compressor motor 148 is provided. The compressor motor 148 is coupled to a compressor shaft 146, which is in turn coupled with an impeller 138 that is in fluid communication with the housing interior 104, the manifold 122, and the condensing portion 160. The housing 102 defines an integrally molded casing for the impeller 138. The compressor motor 148 can comprise the compressor shaft 146, as well as bearings, rotors, and a capacitor, all of which can be provided within the motor housing 144. The compressor 136 can be any type of compressor suitable for compressing the evaporated water vapor and raising the pressure of the water vapor in preparation for condensation, non-limiting examples of which include a centrifugal compressor, an impeller driven compressor, a piston pump compressor, or a positive displacement pump.

The external compressor 170 couples with the non-condensable gas outlet 108 in order to lower the pressure of the vapor compression distillation assembly 100 to a pressure below ambient. The external compressor 170 can be any type of compressor suitable for creating a negative pressure environment within the housing interior 104 relative to atmospheric pressure, non-limiting examples of which include a positive displacement pump, an impeller driven compressor, or a piston pump compressor. The external compressor 170 should have sufficient size and/or capacity such that it is capable of producing enough negative pressure to bring the pressure in the housing interior 104 down to a pressure low enough to cause spontaneous boiling and flash evaporation of the influent liquid. In an exemplary embodiment, the external compressor 170 can be smaller in size or capacity than the compressor 136, though it will be understood that the external compressor 170 can also be equivalent in size or capacity to the compressor 136, or even larger in size or capacity than the compressor 136.

Figure 5:
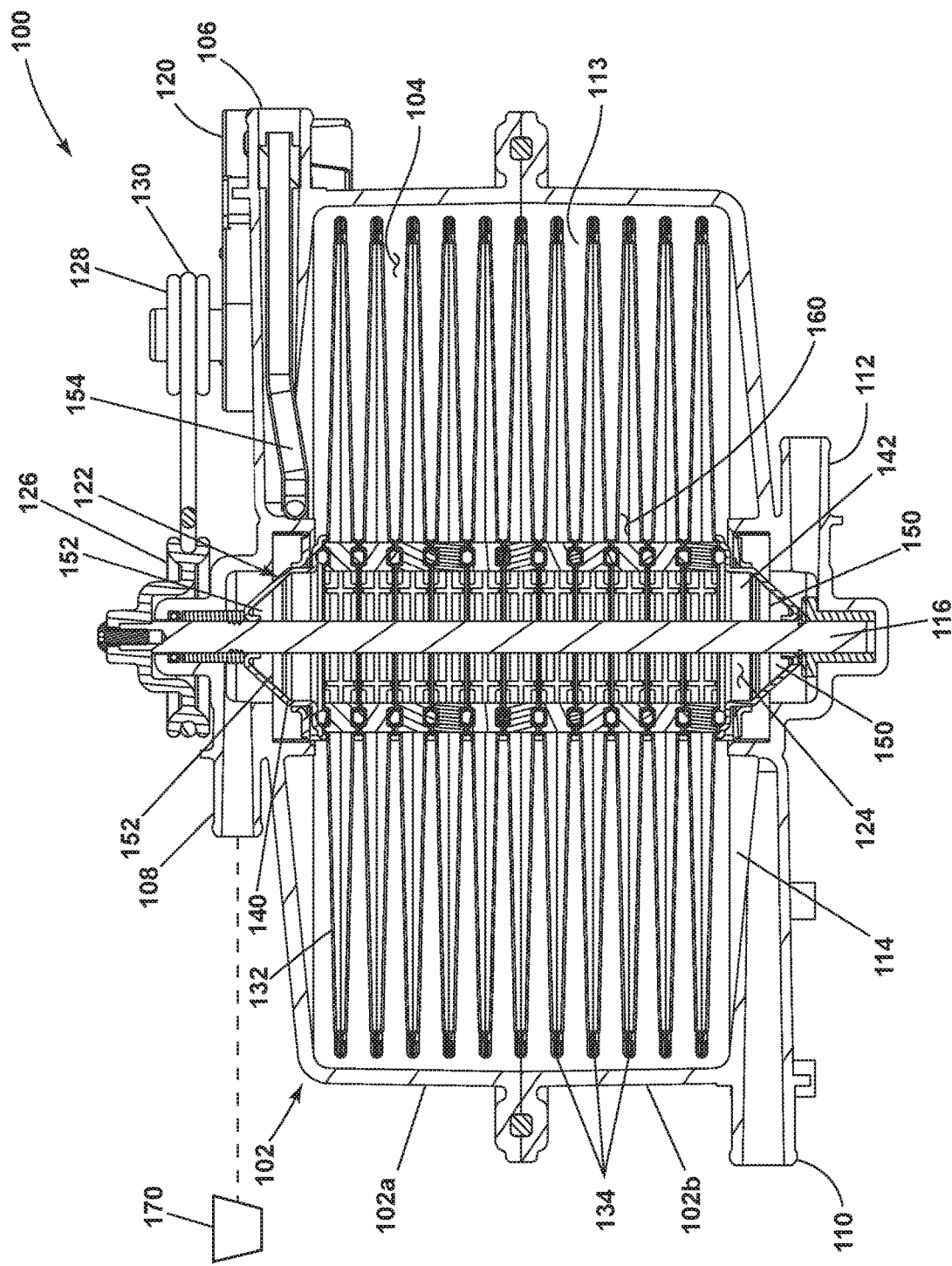
FIG. 5 illustrates a second cross-sectional view of the vapor compression distillation assembly of FIG. 3.

FIG. 5 illustrates a second cross-sectional view of the vapor compression distillation assembly 100 in which the flow paths of the inlets and outlets can be better seen. For example, the influent inlet 106 can include a delivery conduit 154 that can spray the influent liquid onto the rotatable disc assembly 132, specifically onto the outer surfaces of the hollow discs 134. The sump 114 is fluidly coupled with the concentrate outlet 110 for removal of soil and other solid contaminants present in the influent liquid. The housing interior 104 is fluidly coupled with the manifold 122 via upper cap openings 152 on the upper cap 140 that allow the passage of water vapor, after compressing, from the housing interior 104 into the manifold 122 and the condensing portion 160. The collecting portion 124 located at a lower end of the manifold 122 and within the lower cap 142 is in fluid communication with the distillate outlet 112 via the lower cap openings 150 present within the lower cap 142.

Figure 6:
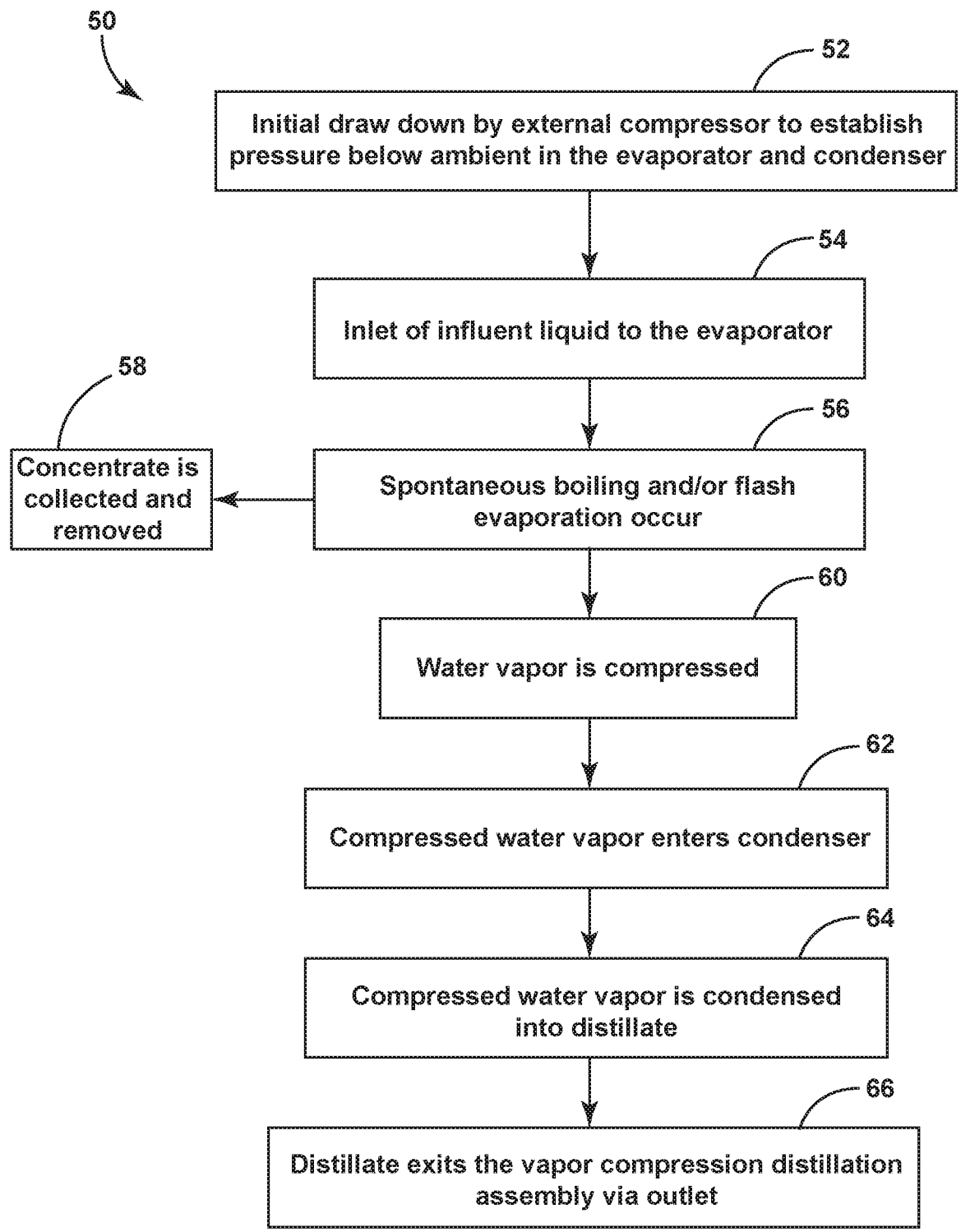
FIG. 6 illustrates a flow chart of the vapor compression distillation process according to an embodiment of the present disclosure.

Turning now to the operation of the vapor compression distillation assembly 100, FIG. 6 illustrates a flow chart of a vapor compression distillation method 50 according to an embodiment of the present disclosure. The vapor compression distillation method 50 improves over traditional vapor compression distillation methods by eliminating the need for heat exchangers to heat the influent liquid by instead using reduced pressure to cause boiling and evaporation without the need for heating. By reducing the operating pressure within the vapor compression distillation assembly 100 sufficiently, distillation can occur at or near room or ambient temperature. This reduces start up time requirements, and removes the high temperature-related needs for costly materials and insulation. Efficiency of the vapor compression distillation process is also improved by allowing for the heat of condensation after the initial flash evaporation occurs to be transferred back through the hollow discs 134 to sustain further evaporation and keep the distillation process going without requiring additional input of heat to the system. Additionally, the resulting distillate will be at or near room temperature, so it can be used for many end purposes, including as immediately drinkable water without the need for a heat exchanger or other heat removal method for cooling the distillate.

At step 52, the external compressor 170 operates in an initial draw down phase to reduce the pressure within the vapor compression distillation assembly 100 such that the evaporation and condensation occur at a pressure below atmospheric pressure. Specifically, the external compressor 170 can reduce the pressure within the vapor compression distillation assembly 100 by operating to draw air out of the vapor compression distillation assembly 100, specifically the housing interior 104, via the non-condensable gas outlet 108 and create a low pressure environment. It will also be understood that the external compressor 170 could alternately or additionally be coupled to the distillate outlet 112 in order to reduce the pressure within the vapor compression distillation assembly 100. The pressure within the housing interior 104 can be reduced to the point at which the influent liquid spontaneously boils and flash evaporates when it enters the vapor compression distillation assembly 100 via the inlet 106. Rather than several hours of pre-heating as with traditional vapor compression distillation methods, the initial draw down phase can be as short as minutes or seconds for the vapor compression distillation assembly 100 to be ready to operate.

Once the initial draw down phase is completed by the external compressor 170 and the vapor compression distillation assembly 100 is held at the desired pressure, influent liquid can enter the housing 102 via the inlet 106 at step 54. The inlet 106 can be positioned such that influent liquid through the inlet 106 is provided via the delivery conduit 154 to the outer surfaces of the hollow discs 134. In an exemplary embodiment, the inlet 106 can result in the influent liquid being sprayed onto the outer surfaces of the hollow discs 134. Further, the hollow discs 134 can be rotated as the influent liquid is sprayed through the delivery conduit 154 to ensure even distribution of the influent liquid on the hollow discs 134. The exterior surface area of the hollow discs 134 can serve to encourage and maximize evaporation performance, in addition to the use of low pressure to cause spontaneous boiling and flash evaporation. The flash evaporation can be thought of as a method for rapidly initiating the vapor compression distillation process. The flash evaporation can result in a slight reduction in the temperature of the housing interior 104 and the hollow discs 134. Thus, in order for subsequent evaporation to continue, the heat lost during flash evaporation can be replaced by the heat of condensation that transfers through the hollow discs 134 to sustain evaporation once the flash evaporation has initiated the process. It will be understood that the flash evaporation can provide a high rate of evaporation for a short period of time until the condensation portion of the process begins and serves to sustain the evaporation.

At step 56, spontaneous boiling and/or flash evaporation of the influent liquid occur due to the reduced pressure environment within the housing 102. Water contained within the influent liquid is evaporated to water vapor. As the water is evaporated to water vapor, any soil or other solid contaminants that were present in the influent liquid are left behind on the outer surfaces of the hollow discs 134. Concurrently, at step 58, the rotatable disc assembly 132 is rotated by the rotating shaft 116, allowing soil and other solid contaminants that were present in the influent liquid to fall from the hollow discs 134 to the sump 114. A wiper 162 can be provided to contact at least a portion of the exterior surface of the hollow discs 134 to wipe or scrape soil and residue off of the hollow discs 134 and allow the soil and residue to fall to the sump 114 as concentrate. In an exemplary embodiment, the wiper 162 can be configured to fit between the hollow discs 134. The concentrate collected in the sump 114 can exit the vapor compression distillation assembly 100 via the concentrate outlet 110. The concentrate can then be provided to a waste tank (not shown) or a waste drain or other suitable collection apparatus for disposal of the concentrate.

The water vapor that is evaporated from the outer surfaces of the hollow discs 134 in step 56 and is then drawn into the impeller 138 by the suction created by the motion of the impeller 138 as indicated by the arrow 156 by operating the compressor motor 148 to rotate the compressor shaft 146 and, in turn, the impeller 138. The water vapor is compressed within the impeller 138 at step 60 by raising the water vapor pressure, then, at step 62, follows the flow path as indicated by the arrow 158 toward the upper cap 140 of the manifold 122. The compression process results in a slight increase in the temperature of the water vapor. The water vapor enters the manifold 122 via the upper cap openings 152 in the upper cap 150. The water vapor can then move into the condensing portion 160 in the interior of the hollow discs 134 acting as a condenser. Because the water vapor has a slightly elevated temperature due to the compression process, then comes into contact with the hollow discs 134, that have a lower temperature than the water vapor due to the influent liquid being sprayed on and evaporated from the outer surfaces of the hollow discs 134, the water vapor is condensed within the hollow discs 134 into distillate at step 64 and collects in the collecting portion 124. In addition, as the water vapor condenses within the hollow discs 134, the energy of condensation is transferred through the hollow discs 134 to further encourage evaporation on the outer surfaces of the hollow discs 134. At step 66, the distillate exits the vapor compression distillation assembly 100 by flowing from the collecting portion 124 into the distillate outlet 112 via the lower cap openings 150, where it can then be re-used or stored for future use as desired. The distillate can flow from the distillate outlet 112 into a storage tank (not shown), or it can be pumped to a re-use location. The resulting distillate exits the vapor compression distillation assembly 100 at a temperature that can be only a few degrees above the temperature of the influent liquid, resulting in only a small amount of energy loss due to the vapor compression distillation method 50.

In addition, throughout the operation of the vapor compression distillation assembly 100, the external compressor 170 can continue to operate beyond the initial draw down to allow for the venting of non-condensable gases through the non-condensable gas outlet 108 that could otherwise be trapped within the condenser. When the water vapor condenses within the condensing portion 160, the non-condensable gases are unable to do so and remain in a gas or vapor form within the vapor compression distillation assembly 100. While the water vapor enters the manifold 122 via the upper cap openings 152 and the condensing portion 160 to be condensed, the non-condensable gases can exit the vapor compression distillation assembly 100 via the non-condensable gas outlet 108, rather than entering the manifold 122 via the upper cap openings 152. The external compressor 170 coupled to the non-condensable gas outlet 108 can encourage the exiting of the non-condensable gases and prevent them from being needlessly trapped within the condensing portion 160. Non-condensable gases can include, by way of non-limiting example, gases dissolved in the influent liquid, other volatiles that may be present in the influent liquid, air that may be left within the housing interior 104 after the initial draw down due to an imperfect vacuum, or air that may leak into the housing interior 104 due to imperfect seals. The external compressor 170 does not have to be operated at the same speed as that required for the initial draw down, but could be operated at a slower speed to provide the continuous venting function.

The vapor compression distillation assembly 100 can be used in a wide variety of contexts, environments, and implementations. Non-limiting examples of such uses include in any water recycling appliance, in household appliances that use water, in whole-home water recycling systems, in larger water recycling systems such as neighborhood water recycling systems, or under-the-sink drinking water recycling systems. By treating water to reclaim and recycle it, both water and energy are saved. Household appliances with which the vapor compression distillation assembly 100 can be employed include, by way of non-limiting example, dishwashers laundry treating appliances, including both laundry washing machines and laundry drying machines. Distillate exiting the vapor compression distillation assembly 100 can be cycled back into a household appliance for further use, or can be provided to a collecting or storage assembly for future use.

The vapor compression distillation assembly disclosed herein can be provided within a dryer or combination washer/dryer similar to or the same as the dryer and combination washer/dryer in U.S. Provisional Patent Application No. 62/724,917, filed Aug. 30, 2018, entitled "LOW PRESSURE LAUNDRY TREATING APPLIANCE," which is herein incorporated by reference in full.

By way of example, the vapor compression distillation assembly 100 can be used for distilling used wash water within a dishwasher. The water exiting from the wash cycle in a dishwasher can be about 40° C. In order to cause flash boiling and evaporation for the influent liquid at 40° C., the housing interior 104 would be reduced to a pressure of, for example, 42-74 mBar to ensure initial flash evaporation. In this example, the external compressor 170 can be a positive displacement pump running at 0.5 liters per minute with an initial draw down time of approximately 7 minutes. If the dishwasher had a 3.2 L fill volume, the entirety of the wash liquid could be distilled within about 13 minutes, then provided back to the dishwasher for use in the rinse cycle.

The embodiments of the vapor compression distillation assembly and methods of the present disclosure allow for the elimination of the considerations associated with the high temperatures used in traditional vapor compression distillation assemblies, such as allowing for the use of less expensive materials that do not need to be able to withstand higher temperatures and eliminating the need for insulative materials to be included to prevent heat loss from the vapor compression distillation assembly. In addition, the expense of the heat exchanger is eliminated by operating the vapor compression distillation process below atmospheric pressure at ambient temperatures. The positive displacement compressor can be small and low cost and can reduce pressure sufficiently in a short period of time to reduce pre-heating and start up time.

To the extent not already described, the different features and structures of the various embodiments can be used in combination with each other as desired. That one feature may not be illustrated in all of the embodiments is not meant to be construed that it cannot be, but is done for brevity of description. Thus, the various features of the different embodiments can be mixed and matched as desired to form new embodiments, whether or not the new embodiments are expressly described.

While the present disclosure has been specifically described in connection with certain specific embodiments thereof, it is to be understood that this is by way of illustration and not of limitation. Reasonable variation and modification are possible within the scope of the forgoing disclosure and drawings without departing from the spirit of the present disclosure.

What is claimed is:

1. A vapor compression distillation assembly comprising:
    an evaporator having an interior with a low pressure relative to an ambient pressure for receiving an unheated liquid at an ambient temperature lower than a boiling point of the liquid;
    a housing defining at least a portion of the evaporator and having an influent inlet for receiving the unheated liquid and a distillate outlet;
    a rotating disc assembly located within the housing, the disc assembly having an interior defining a condensing portion and an exterior defining a surface area of the evaporator;
    a collecting portion located within the housing for receiving distillate from the condensing portion and fluidly coupled to the distillate outlet; and
    a compressor coupled to the housing and fluidly coupling the evaporator to the condensing portion;
    wherein the interior is at a pressure low enough to cause spontaneous boiling and flash evaporation of the liquid.

2. The vapor compression distillation assembly of claim 1 wherein the housing further comprises an upper housing defining the influent inlet and a lower housing defining the distillate outlet.

3. The vapor compression distillation assembly of claim 2 wherein the lower housing at least partially defines a sump for collecting concentrate.

4. The vapor compression distillation assembly of claim 3 wherein the lower housing further comprises a concentrate outlet.

5. The vapor compression distillation assembly of claim 2 wherein the upper housing further comprises a non-condensable gas outlet.

6. The vapor compression distillation assembly of claim 5 further comprising an external compressor, additional to the compressor, and fluidly coupled to the non-condensable gas outlet to lower the low pressure interior to a pressure below the ambient pressure.

7. The vapor compression distillation assembly of claim 1 further comprising a rotating shaft extending upwardly within the interior and through a shaft opening in the housing.

8. The vapor compression distillation assembly of claim 7 wherein a manifold is circumferentially disposed about the rotating shaft.

9. The vapor compression distillation assembly of claim 8 wherein the disc assembly is a plurality of stacked discs provided circumferentially about and coupled to the manifold and the rotating shaft.

10. The vapor compression distillation assembly of claim 9 wherein the plurality of stacked discs are fixedly coupled to each other in a fixed, spaced relationship.

11. The vapor compression distillation assembly of claim 1 wherein the compressor further comprises an impeller.

12. The vapor compression distillation assembly of claim 1 further comprising an external compressor, additional to the compressor, and fluidly coupled to the evaporator to lower the interior pressure to the low pressure below the ambient pressure.

13. The vapor compression distillation assembly of claim 1 wherein the compressor further comprises an impeller in fluid communication with the interior.

14. The vapor compression distillation assembly of claim 13 wherein the housing defines an integrally molded casing for the impeller.

* * * * *